Aug. 25, 1964 D. R. TAYLOR, JR 3,146,304

MULTI-FUNCTION SYSTEM FOR TELEVISION RECEIVERS

Filed March 19, 1962

INVENTOR.
DONALD R. TAYLOR, JR.
BY
Fordyce A. Bothwell
ATTORNEY 3,146,304
Patented Aug. 25, 1964

3,146,304

MULTI-FUNCTION SYSTEM FOR TELEVISION RECEIVERS

Donald R. Taylor, Jr., Philadelphia, Pa., assignor to Philco Corporation, Philadelphia, Pa., a corporation of Delaware Filed Mar. 19, 1962, Ser. No. 180,576
14 Claims. (Cl. 178—5.8)

This invention relates to television receivers and more particularly to the simplification of such receivers by the provision therein of a multi-function system which reduces the tube complement of the receiver and thus effects economies both in cost of manufacture and service maintenance.

As is well known, in a television receiver many functions are required to be performed in order to translate the received video signal information into a satisfactory picture and to reproduce the sound. Among the necessary functions are video amplification, sync separation, protection of sync separation against noise, production of an AGC (automatic gain control) voltage, and noise protection of the latter. In the modern intercarrier sound receiver, another function is sound IF amplification. The performance of these various functions has heretofore required the employment of a number of vacuum tubes and associated circuits.

One object of the present invention is to effect simplification of television receivers as regards the performance of these various functions.

Another object of the invention is to provide a multi-function system for the purpose of simplification employing a single vacuum tube.

Other objects and features of the invention will become apparent as the description proceeds.

In accordance with this invention, a multi-function system is provided in which a single multi-grid vacuum tube is made to serve as a video amplifier, sync separator and noise switch. Also in accordance with this invention, AGC voltage may be derived from the sync separator portion of the system, and in the case of an intercarrier sound receiver the same tube may be made to serve as a sound IF amplifier.

The invention may be fully understood from the following detailed description with reference to the accompanying drawing wherein FIG. 1 is a diagrammatic illustration of a multifunction system according to one embodiment of the present invention;

Figure 1:
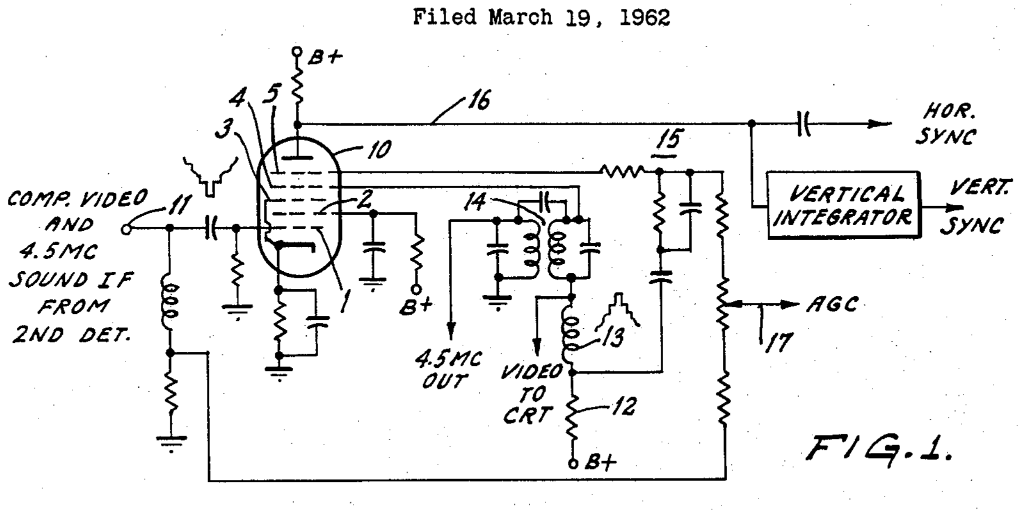

Referring first to FIG. 1, there is shown a pentagrid tube 10, the five grids of which are designated as Nos. 1 to 5. The tube is similar to the conventional heptode except that in this instance the No. 3 grid is made to serve as a suppressor and the No. 5 grid is made to serve as a control grid. The cathode and grids Nos. 1 to 4 are connected as a usual pentode video output stage, simultaneously providing 4.5 mc. sound IF amplification, grid No. 4 serving as the anode. Accordingly the composite video signal with sync negative and the 4.5 mc. sound IF signal are supplied from the second detector to terminal 11 which is coupled to grid No. 1. The composite video signal is amplified and inverted in polarity and is derived from across resistor 12 and peaking coil 13. The 4.5 mc. sound IF signal is also amplified and is derived through the tuned transformer 14.

The amplified and inverted composite video signal derived from resistor 12 is also supplied to grid No. 5 through a usual sync separator coupling arrangement 15.

The anode is operated at reduced potential for early cut-off. Thus the No. 5 grid and the anode are connected and perform as elements of a typical triode sync separator driven from the sync-positive composite video signal developed at grid No. 4. The separated sync is derived from the anode via connection 16.

The self-levelling bias as grid No. 5 may be removed and combined with second detector voltage in the usual way for AGC purposes, the AGC voltage being derived at connection 17.

Both the sync separator and video amplifier circuits utilize the same electron stream for their operation, the separator being effectively in cascade with the video stage. The interaction of the two circuits in the presence of interfering noise transients gives inherent noise protection to the sync separator and to the AGC voltage produced by it. If a large noise spike appears in the input signal at the No. 1 grid, it drives the tube into cut-off. The noise pulse in the signal at grid No. 4 is therefore clipped, and while it would still be capable of producing upset of a usual sync separator, in this instance the No. 5 grid cannot charge on the noise pulse since the pulse itself has turned off the tube's space current by its action at grid No. 1. The sync separator thus enjoys noise protection because of its interaction with the video amplifier section of the circuit, and at the same time the AGC voltage is also protected against noise. Thus the tube performs as a noise switch in addition to its several other functions.

It should be noted that since the amount of current which is removed from grid No. 4 by the sync separator action is small in proportion to the current leaving the tube at that grid, there is no appreciable sync modulation of the 4.5 mc. current. However, if desired, any modulation can be prevented by deriving the 4.5 mc. output at the plate as well as at grid No. 4. This can be done by means of a bifilar trap coil or by simple insertion of a choke in the plate lead and by connecting a small coupling capacitor between the plate and grid No. 4.

In the system shown in FIG. 1, a single tube replaces the functions of a pentode and two triodes, i.e. the normal video output stage, the sync separator, and the noise inverter.

Figure 2:
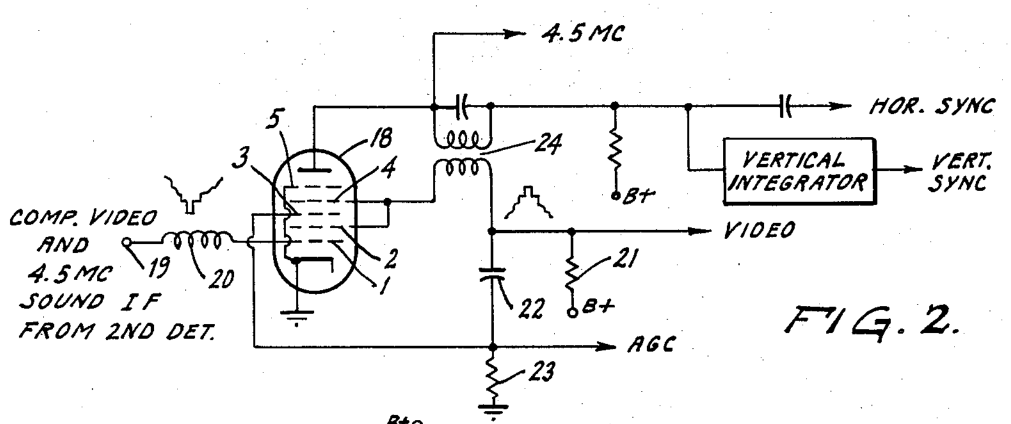
FIG. 2 is a similar illustration of another embodiment.

Referring now to FIG. 2, there is shown another embodiment of the invention wherein a single tube is employed as a triode video amplifier and as a pentode sync separator. The composite video signal with sync negative is applied to the No. 1 grid of the pentagrid tube 18 via terminal 19. The 4.5 mc. sound IF signal is similarly applied to the No. 1 grid. The latter signal may be additionally peaked by inductor 20 resonating with the grid input capacitance at 4.5 mc.

With respect to the composite video signal, the No. 2 and No. 4 grids act as the plate of a triode which amplifies and inverts the signal. The video output is derived from across the load resistor 21. The composite video signal is also supplied via coupling capacitor 22 to the No. 3 grid which has a grid leak 23. Sync separation in the usual manner takes place at the No. 3 grid which serves as the control grid of a pentode of which the No. 4 grid is the screen and the No. 5 grid is the suppressor. The separated sync is derived from the anode. AGC voltage is derived at the No. 3 grid as illustrated.

In this embodiment noise protection is had in the same way as in the system of FIG. 1, i.e. a noise pulse at the No. 1 grid turns off the tube's space current.

With respect to the 4.5 mc. sound IF signal supplied to the No. 1 grid, this signal is amplified and may be derived as shown by means of a bifilar transformer 24. Since the 4.5 mc. signal is derived as the sum of the currents in the two output circuits it is not affected by the sync separator action.

In each of the two embodiments above described a pentagrid tube is made to simulate a triode and a pentode cascaded in either order, i.e. triode-pentode or pentode-triode. It is also possible to achieve substantially the same results by employing a pentode to simulate two cascaded triodes. In such case the system could be the same as in FIG. 2 with the No. 4 and No. 5 grids eliminated. There would then be only two electron-receiving electrodes, i.e. the No. 2 grid and the anode.

Figure 3:
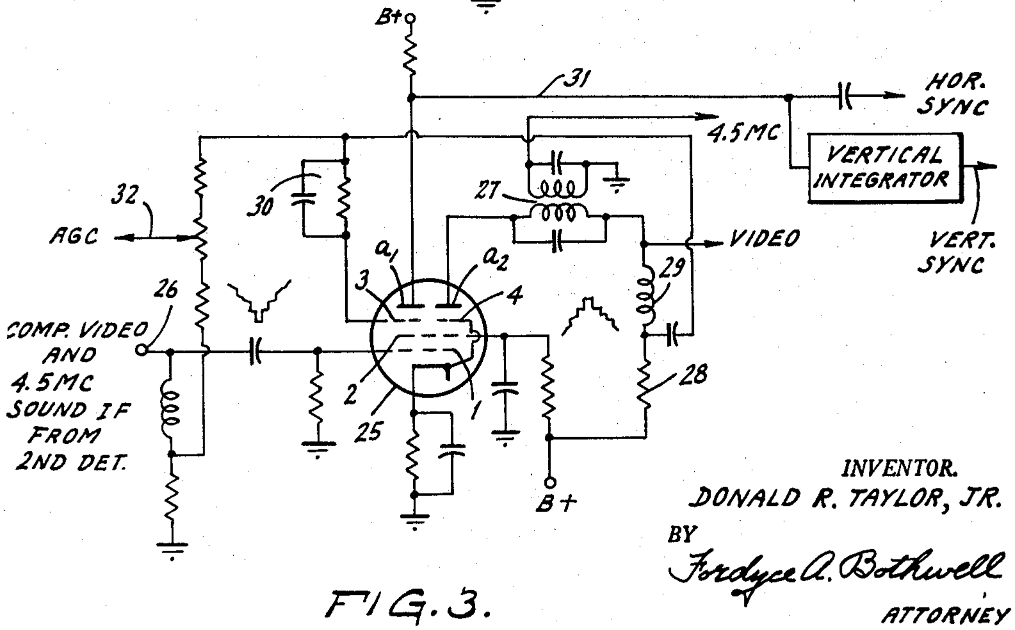
FIG. 3 is a similar illustration of another embodiment.

Referring now to FIG. 3, there is shown another embodiment of the invention in which a split beam type tube 25 is employed which has four grids designated as Nos. 1 to 4 and two anodes $a_1$ and $a_2$. Grids 1 and 3 are employed as control electrodes. Grid 2 is a screen and grid 4 is a suppressor, so that the right-hand section is a pentode. The two anodes of course are electron-receiving electrodes.

The composite video signal with sync negative and the 4.5 mc. sound IF signal are supplied from the second detector to the No. 1 grid via terminal 26. The pentode section amplifies both signals in usual manner. The amplified 4.5 mc. signal is derived through tuned transformer 27. The amplified and inverted composite video signal is derived from across resistor 28 and peaking coil 29.

The latter signal derived from resistor 28 is also supplied to grid No. 3 through coupling means 30 for sync separator action. The No. 3 grid and anode $a_1$ serve as elements of typical triode sync separator, the separated sync being derived from anode $a_1$ via connection 31. Here again noise protection is had in the same way as in the previously described embodiments.

The self-leveling bias at grid No. 3 may be removed and combined with second detector voltage in the usual way for AGC purposes, the AGC voltage being derived at connection 32.

While the invention has been illustrated and described with reference to certain embodiments, it will be understood that it is not limited thereto but contemplates such modifications and further embodiments as may occur to those skilled in the art.

I claim:

1. In a television receiver adapted to receive and detect a composite signal having video and sync components of opposite polarities with respect to a reference level; a vacuum tube having at least two non-deflection control electrodes and at least two electron-receiving electrodes; means for supplying the detected composite signal with sync negative to one of said control electrodes; means for deriving the same signal from one of said electron-receiving electrodes amplified and inverted in polarity; means for applying the amplified and inverted signal to another one only of said control electrodes; means including the latter control electrode and another of said electron-receiving electrodes for separating the sync from the amplified and inverted signal; and means for deriving the separated sync from said other electron-receiving electrode.

2. In a television receiver adapted to receive and detect a composite signal having video and sync components of opposite polarities with respect to a reference level and a sound signal which is converted to a sound IF signal; a vacuum tube having at least two non-deflection control electrodes and at least two electron-receiving electrodes; means for supplying the detected composite signal with sync negative and said sound IF signal to one of said control electrodes; means for deriving from one of said electron-receiving electrodes the sound IF signal amplified and the composite video signal amplified and inverted in polarity; means for applying the latter signal to another one only of said control electrodes; means including the latter control electrode and another of said electron-receiving electrodes for separating the sync from the amplified and inverted signal; and means for deriving the separated sync from said other electron-receiving electrode.

3. In a television receiver adapted to receive and detect a composite signal having video and sync components of opposite polarities with respect to a reference level and a sound signal which is converted to a sound IF signal; a vacuum tube having at least two non-deflection control electrodes and at least two electron-receiving electrodes; means for supplying the detected composite signal with sync negative and said sound IF signal to one of said control electrodes; means for deriving from one of said electron-receiving electrodes the sound IF signal amplified and the composite video signal amplified and inverted in polarity; means for applying the latter signal to another one only of said control electrodes; means including the latter control electrode and another of said electron-receiving electrodes for separating the sync from the amplified and inverted signal; means for deriving from the last-recited means an automatic gain control voltage; and means for deriving the separated sync from said other electron-receiving electrode.

4. In a television receiver adapted to receive a composite video signal having video and sync components of opposite polarities with respect to a reference level; a vacuum tube having a cathode, an anode and a plurality of grids in succession between said cathode and said anode; means for supplying said composite signal with sync negative to the first grid; means for deriving from a succeeding grid the same signal amplified and inverted in polarity; means for applying the amplified and inverted signal to another grid succeeding the last-mentioned grid; means including said other grid and said anode for separating the sync from the applied signal; and means for deriving the separated sync from said anode.

5. In a television receiver adapted to receive a composite video signal having video and sync components of opposite polarities with respect to a reference level; a vacuum tube having a cathode, an anode and five grids in succession between said cathode and said anode; means forming a pentode stage in which said cathode and four of said grids constitute a pentode; means for supplying said composite signal with sync negative to the first grid; means for deriving from the fourth grid the same signal amplified and inverted in polarity; means for applying the amplified and inverted signal to the fifth grid; means including the fifth grid and said anode for separating the sync from the applied signal; and means for deriving the separated sync from said anode.

6. In a television receiver adapted to receive a composite video signal having video and sync components of opposite polarities with respect to a reference level; a vacuum tube having a cathode, an anode and a plurality of grids in succession between said cathode and said anode; means for supplying said composite signal with sync negative to the first grid; means for deriving from a succeeding grid the same signal amplified and inverted in polarity; means for supplying the amplified and inverted signal to another grid succeeding the last-mentioned grid; means including said other grid and said anode for separating the sync from the applied signal; means for deriving from the last-recited means an automatic grain control voltage; and means for deriving the separated sync from said anode.

7. In a television receiver adapted to receive a composite video signal having video and sync components of opposite polarities with respect to a reference level; a vacuum tube having a cathode, an anode and five grids in succession between said cathode and said anode; means forming a pentode stage in which said cathode and four of said grids constitute a pentode; means for supplying said composite signal with sync negative to the first grid; means for deriving from the fourth grid the same signal amplified and inverted in polarity; means for applying the amplified and inverted signal to the fifth grid; means including the fifth grid and said anode for separating the sync from the applied signal; means for deriving from the last-recited means an automatic gain control voltage; and means for deriving the separated sync from said anode.

8. In a television receiver adapted to receive a composite video signal having video and sync components of opposite polarity with respect to a reference level and a sound signal which is converted to a sound IF signal; a vacuum tube having a cathode, an anode and a plurality of grids in succession between said cathode and said anode; means for supplying said composite signal with sync negative and said sound IF signal to the first grid; means for deriving the sound IF signal amplified from a succeeding grid; means for deriving from the same grid said composite signal amplified and inverted in polarity; means for applying the latter signal to another grid succeeding the last-mentioned grid; means including said other grid and said anode for separating the sync from the latter signal; and means for deriving the separated sync from said anode.

9. In a television receiver adapted to receive a composite video signal having video and sync components of opposite polarity with respect to a reference level and a sound signal which is converted to a sound IF signal; a vacuum tube having a cathode, an anode and five grids in succession between said cathode and said anode; means forming a pentode stage in which said cathode and four of said grids constitute a pentode; means for supplying said composite video signal with sync negative and said sound IF signal to the first grid; means for deriving the sound IF signal amplified from the fourth grid; means for deriving from the same grid said composite video signal amplified and inverted in polarity; means for applying the latter signal to the fifth grid; means including said fifth grid and said anode for separating the sync from the latter signal; and means for deriving the separated sync from said anode.

10. In a television receiver adapted to receive a composite video signal having video and sync components of opposite polarity with respect to a reference level and a sound signal which is converted to a sound IF signal; a vacuum tube having a cathode, an anode and a plurality of grids in succession between said cathode and said anode; means for supplying said composite signal with sync negative and said sound IF signal to the first grid; means for deriving the sound IF signal amplified from a succeeding grid; means for deriving from the same grid said composite video signal amplified and inverted in polarity; means for applying the latter signal to another grid succeeding the last-mentioned grid; means including said other grid and said anode for separating the sync from the latter signal; means for deriving from the last-recited means an automatic gain control voltage; and means for deriving the separated sync from said anode.

11. In a television receiver adapted to receive a composite video signal having video and sync components of opposite polarity with respect to a reference level and a sound signal which is converted to a sound IF signal; a vacuum tube having a cathode; an anode and five grids in succession between said cathode and said anode; means forming a pentode stage in which said cathode and four of said grids constitute a pentode; means for supplying said composite signal with sync negative and said sound IF signal to the first grid; means for deriving the sound IF signal amplified from the fourth grid; means for deriving from the same grid said composite video signal amplified and inverted in polarity; means for applying the latter signal to the fifth grid; means including said fifth grid and said anode for separating the sync from the latter signal; means for deriving from the last-recited means an automatic gain control voltage; and means for deriving the separated sync from said anode.

12. In a television receiver adapted to receive a composite video signal having video and sync components of opposite polarities with respect to a reference level; a vacuum tube having a cathode, an anode and five grids in succession between said cathode and said anode, the fifth grid being connected to said cathode to serve as a suppressor; means for supplying said composite signal with sync negative to the first grid; means for deriving from the second and fourth grids the same signal amplified and inverted in polarity; means for applying the amplified and inverted signal to the third grid; means including the third grid and said anode for separating the sync from the applied signal; and means for deriving the separated sync from said anode.

13. In a television receiver adapted to receive a composite video signal having video and sync components of opposite polarity with respect to a reference level and a sound signal which is converted to a sound IF signal; a vacuum tube having a cathode, an anode and five grids in succession between said cathode and said anode, the fifth grid being connected to said cathode to serve as a suppressor; means for supplying said composite video signal with sync negative and said sound IF signal to the first grid; means for deriving said composite video signal from the second and fourth grids amplified and inverted in polarity; means for applying the latter signal to the third grid; means including said third grid and said anode for separating the sync from the latter signal; means for deriving the separated sync from said anode; and means for deriving the sound IF signal amplified from the total space current of said tube.

14. In a television receiver adapted to receive and detect a composite video signal having video and sync components of opposite polarities with respect to a reference level; a vacuum tube having a cathode, two anodes each arranged to receive electrons from said cathode, three non-deflection grids in the electron path to one of said anodes, and a fourth non-deflection grid individual to the other anode; means forming a pentode stage in which said cathode, said three grids and said one anode constitute a pentode; means for supplying the detected composite signal with sync negative to the first of said three grids; means for deriving from said one anode the same signal amplified and inverted in polarity; means for applying the amplified and inverted signal to said fourth grid only; means including said fourth grid and said other anode for separating the sync from the applied signal; and means for deriving the separated sync from said other anode.

References Cited in the file of this patent

UNITED STATES PATENTS

| | | |
|---|---|---|
| 2,785,299 | Spracklen | Mar. 12, 1957 |
| 3,001,014 | Stroh | Sept. 19, 1961 |

OTHER REFERENCES

Publication: Beam Deflection Synchronous Detection Circuit, Peters et al. RCA Technical Note, TN 171; August 1958.